(12) United States Patent
Moision et al.

(10) Patent No.: US 9,505,079 B2
(45) Date of Patent: Nov. 29, 2016

(54) HIGH CAPACITY ALUMINUM SPOT WELDING TRANS-GUN PRIMARY CABLE

(75) Inventors: William C. Moision, Northville, MI (US); Elizabeth Therese Hetrick, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 947 days.

(21) Appl. No.: 13/586,341

(22) Filed: Aug. 15, 2012

(65) Prior Publication Data
US 2014/0048523 A1 Feb. 20, 2014

(51) Int. Cl.
| | |
|---|---|
| B23K 9/095 | (2006.01) |
| B23K 11/11 | (2006.01) |
| B23K 11/30 | (2006.01) |
| B23K 11/31 | (2006.01) |

(52) U.S. Cl.
CPC .......... B23K 11/115 (2013.01); B23K 11/3018 (2013.01); B23K 11/314 (2013.01)

(58) Field of Classification Search
CPC ... B23K 11/11; B23K 11/115; B23K 11/185; B23K 11/24; B23K 11/241; B23K 11/3018; B23K 11/314
See application file for complete search history.

(56) References Cited

U.S. PATENT DOCUMENTS

| | | | |
|---|---|---|---|
| 4,140,891 A | 2/1979 | Lenox | |
| 4,488,135 A * | 12/1984 | Schwartz | 336/62 |
| 4,507,534 A * | 3/1985 | Kaufmann et al. | 219/86.7 |
| 4,623,775 A | 11/1986 | Lange | |
| 6,066,824 A | 5/2000 | Crawford | |
| 6,533,594 B1 * | 3/2003 | Kurup | 439/197 |
| 7,081,586 B2 * | 7/2006 | Rehrig | 174/15.1 |

FOREIGN PATENT DOCUMENTS

| | | |
|---|---|---|
| EP | 1614496 A2 | 1/2006 |
| JP | 11314163 A2 | 11/1999 |

OTHER PUBLICATIONS

Antic, Richard S.; Tonyali, Koksal; Woldesus, Futsum, "EXRAD Hybrid Cables vs. Welding Cable Comparison," Champlain Cable (Oct. 1, 2009).
Champlain Cable Corporation, "Automotive—Inventing the Future of Wire and Cable: EXRAD XLE 1000 Volt."
Rwesco, "Portable Spot Welding Guns for Every Application," http://www.spotweldequip.com/Transguns.htm.
Robotworx, "Integral Transformers on Welding Guns Make Robots More Efficient," http://www.robots.com/articles/viewing/integral-transformers-on-welding-guns-make-robotos-more-efficient/1618.

* cited by examiner

*Primary Examiner* — David Angwin
*Assistant Examiner* — Amit K Singh
(74) *Attorney, Agent, or Firm* — Raymond Coppiellie; Price Heneveld LLP

(57) ABSTRACT

A high capacity aluminum spot welding trans-gun includes a pair of opposed electrodes, a weld control that controls the operation of the trans-gun, and a transformer that regulates the voltage to the trans-gun having a primary input voltage and secondary output voltage. A liquid-cooled high voltage primary conductor electrically connects the weld control to the transformer primary input and a low voltage secondary conductor electrically connects the transformer secondary output to the welding gun to energize the opposed electrodes.

12 Claims, 4 Drawing Sheets

HIGH CAPACITY ALUMINUM SPOT WELDING TRANS-GUN PRIMARY CABLE

FIELD OF THE INVENTION

The present invention generally relates to a high capacity aluminum spot welding trans-gun primary cable to achieve operational flexibility and improved articulation capability at minimal cost.

BACKGROUND OF THE INVENTION

Spot welding trans-guns are commonly used in steel industrial welding applications, particularly in automated processes utilizing robotic technology. The automotive industry has been progressively moving toward aluminum body panels and structural components to reduce vehicle weight, while also retaining structural integrity. However, in applications for such spot welding trans-guns, aluminum spot welding requires welding currents approximately three times that of steel of a similar gauge. These higher currents mandate larger, higher capacity primary conductors to transmit welding current from the weld controller to the robotically mounted trans-gun in order to prevent the generation of excessive temperatures in the conducting material, such as copper, caused by the electrical resistance of the conducting material. More specifically, the cross-sectional diameter of the conducting material of the primary conductor must be significantly increased to avoid excessive heat energy being generated within the conducting material. These larger, heavier primary conductors are, however, not as flexible and are capable of only very high bend radii, which significantly reduce articulation capability, particularly when manipulated by robots, and are expensive.

Efforts to improve primary conductor features included efforts to reduce the cross-sectional diameter of the conducing material, while providing air cooling to the primary conductor. These efforts, however, have been unsuccessful. Hence, a high capacity aluminum spot welding trans-gun primary cable capable of improved articulation capability, particularly when manipulated by robots, while retaining acceptable amperage and temperature performance, at minimal cost which overcomes these drawbacks, would be advantageous.

SUMMARY OF THE INVENTION

The high capacity aluminum spot welding trans-gun primary cable of the present invention particularly overcomes the foregoing drawbacks of alternative systems by improving primary conductor bend radius by at least 300%, reducing costs by 60%, increasing conductor ampacity threefold at a fixed rated weight per foot, reducing robot dress packaging requirements and utilizing the water already used to cool the weld gun to also cool the primary conductors in the dress package, eliminating redundant water cooling hoses.

The benefits of the present invention is the improved articulation capability of a spot welding trans-gun for aluminum applications by providing a more flexible primary cable encased in a water jacket and cooled with re-circulated coolant in a system that is durable and safe, at a lower cost.

It is therefore an aspect of the present invention to provide a high capacity aluminum spot welding trans-gun, particularly adapted for use by an automated robot, comprising a base, a table pivotably mounted to the base, a vertical articulating arm mounted at a first end to the base and adapted for motion about two axes relative to the base through a central vertical pivot rod and a first horizontal pivot hinge, a horizontal articulating arm mounted at a first end to a second end of the vertical articulating arm and adapted for motion about a second horizontal pivot hinge, and a distal articulating arm mounted at a first end to a second end of the horizontal articulating arm and adapted for motion about a third horizontal pivot hinge. The high capacity aluminum spot welding trans-gun further comprises a welding gun that includes a pair of opposed electrodes attached to the distal articulating arm, a weld control for controlling the operation of the trans-gun, a transformer for controlling the voltage to the trans-gun having a primary input voltage and secondary output voltage, a liquid-cooled high voltage primary conductor that electrically connects the weld control to the transformer primary input, and a low voltage secondary conductor that electrically connects the transformer secondary output to the welding gun.

Another aspect of the invention is a high capacity aluminum spot welding trans-gun, wherein the conductive material of the liquid-cooled primary conductor has a cross-sectional diameter of less than 350 mcm.

Still another aspect of the present invention is a high capacity aluminum spot welding trans-gun, wherein the liquid-cooled primary conductor has a bend radius of less than 2.5 inches.

Yet another aspect of the present invention is a high capacity aluminum spot welding trans-gun, wherein the liquid-cooled primary conductor is rated to at least 1800 amps at 100% duty cycle.

An additional aspect of the present invention is a high capacity aluminum spot welding trans-gun, wherein the liquid-cooled primary conductor includes a sealed hose disposed concentrically about the primary conductor.

A still further aspect of the present invention is a high capacity aluminum spot welding trans-gun, wherein the voltage of the liquid-cooled primary conductor is at least 400V and the voltage of the secondary conductor is between 4V and 50V.

A further aspect of the present invention is a high capacity aluminum spot welding trans-gun, further comprising a rotatable actuating arm mounted on the base and a link having a first end and a second end, wherein the first end of the horizontal articulating arm further comprises a lever arm attached to the first end of the link and the second end of the link is attached to the rotatable actuating arm.

Still another aspect of the present invention is a high capacity aluminum spot welding trans-gun, wherein the liquid-cooled primary conductor has a DC resistance of less than 30 microhms per foot and a heat energy removal rate of 320, 256 BTUs per hour.

Another aspect of the present invention is a high capacity aluminum spot welding trans-gun comprising a welding gun including a pair of opposed electrodes, a weld control for controlling the operation of the trans-gun, a transformer having a primary input voltage and secondary output voltage, a liquid-cooled high voltage primary conductor that electrically connects the weld control to the transformer primary input, and a low voltage secondary conductor that electrically connects the transformer secondary output to the welding gun.

Still another aspect of the present invention is a high capacity aluminum spot welding trans-gun, wherein the liquid-cooled primary conductor is encased in a nonconductive insulative coating.

Yet another aspect of the present invention is a high capacity aluminum spot welding trans-gun, wherein the liquid-cooled primary conductor is further encased in a nonconductive hose concentrically disposed about the primary conductor and its coating to form a water jacket within which a coolant flows.

A yet additional aspect of the present invention is a high capacity aluminum spot welding trans-gun further comprising coolant supply lines, wherein the coolant comprises ethylene glycol and the cooling lines between the primary conductors and any other conductor or ground are not less than 18 inches in length.

Still another aspect of the present invention is a high capacity aluminum spot welding trans-gun, wherein the coolant is treated to reduce its conductivity.

Another aspect of the present invention is a method of providing a high capacity aluminum spot welding trans-gun. The method comprises the steps of providing a welding gun including a pair of opposed electrodes, providing a weld control for controlling the operation of the trans-gun, providing a transformer having a primary input voltage and secondary output voltage, electrically connecting a liquid-cooled high voltage primary conductor between the weld control and the transformer primary input, and electrically connecting a low voltage secondary conductor between the transformer secondary output and the welding gun.

A further aspect of the present invention is a method of providing a high capacity aluminum spot welding trans-gun, further including the step of delivering an electrical potential of at least 400V through the liquid-cooled primary conductor.

These and other aspects, objects, and features of the present invention will be understood and appreciated by those skilled in the art upon studying the following specification, claims, and appended drawings.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in FIGS. 1-5. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
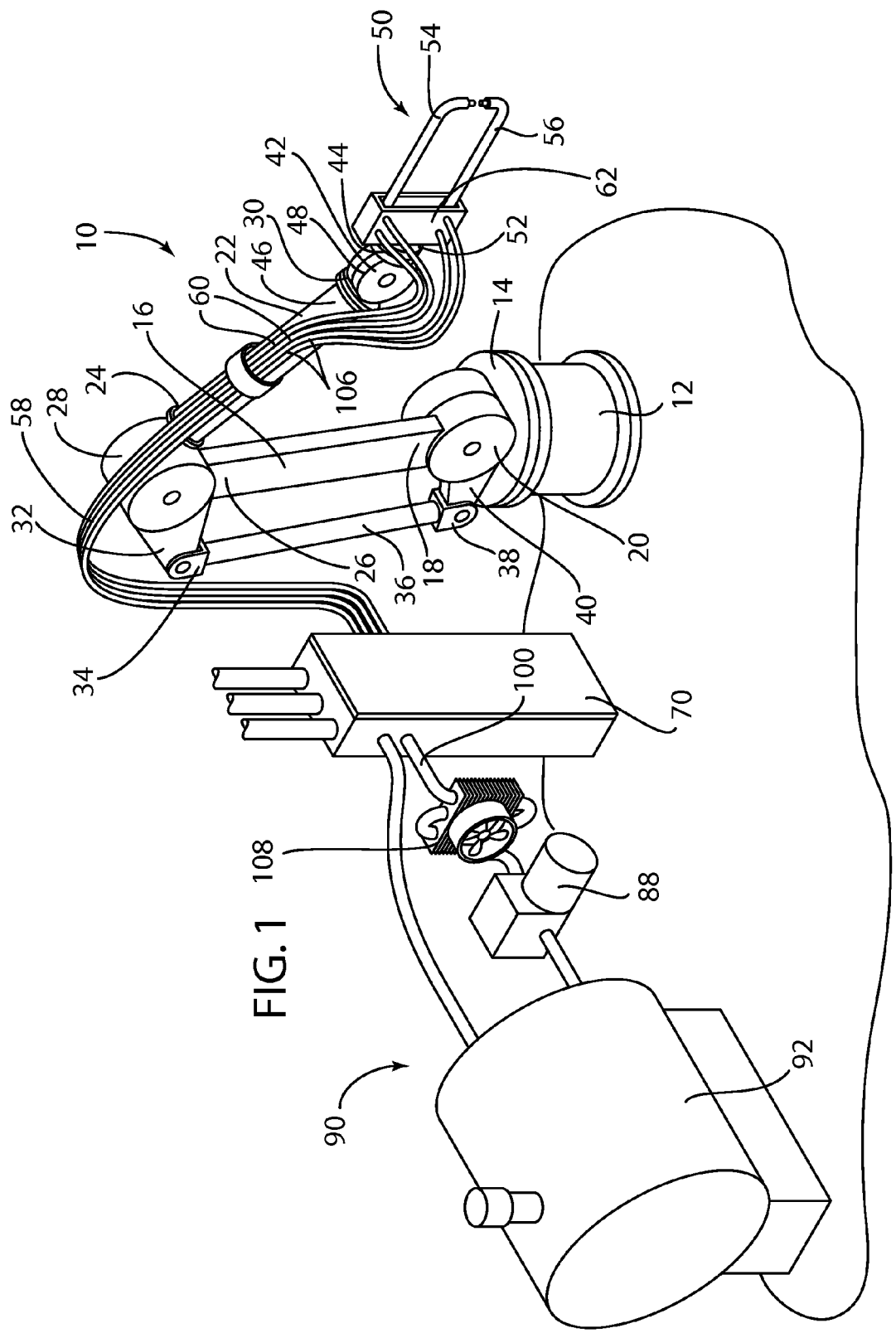
FIG. 1 is a front perspective view of a high capacity aluminum spot welding trans-gun incorporating a liquid-cooled primary cable in accordance with the present invention.

As shown in FIG. 1, the present invention is preferably adapted for use by an automated robot 10 is provided for spot welding aluminum components as described below. The automated robot 10 includes a base 12 and a table 14 pivotably mounted to the base 12. A vertical articulating arm 16 is mounted at a first end 18 to the base 12 and is adapted for motion about two axes relative to the base 12 through a central vertical pivot rod (not shown) and a first horizontal pivot hinge 20. As shown, the vertical articulating arm 16 extends generally upwardly and provides the automated robot 10 with most of its vertical height. A horizontal articulating arm 22 is mounted at a first end 24 to a second end 26 of the vertical articulating arm 16 and is adapted for motion about a second horizontal pivot hinge 28. The first end 24 of the horizontal articulating arm 22 is further preferably provided with a lever arm 32 to which is attached a first end 34 of a link 36. The second end 38 of the link 36 is attached to a rotatable actuating arm 40 mounted on the base 12. Thus, by rotating the actuating arm 40, the actuating arm 40 raises or lowers the link 36, causing the lever arm 32 to rotate the horizontal articulating arm 22 up or down to facilitate articulation of the robot 10. Finally, a distal articulating arm 42 is mounted at a first end 44 to a second end 46 of the horizontal articulating arm 22 and is likewise adapted for motion about a third horizontal pivot hinge 48. A high capacity aluminum spot welding trans-gun 50 is attached to a second end 52 of the distal articulating arm 42.

The high capacity aluminum spot welding trans-gun 50 is a conventional spot welder that includes an upper weld electrode 54 and a lower weld electrode 56 capable of being brought into oppositional operational relationship in order to provide a spot weld on an aluminum work piece (not shown) disposed between the electrodes 54, 56. A dress package 58 mounted to the vertical articulating arm 16 and the horizontal articulating arm 22 provides a protected conduit within which the many electrical components are placed that service the high capacity aluminum spot welding trans-gun 50. These components include primary conductors 60, which are terminated in a transformer junction box 62 mounted at the second end 52 of the distal arm 42. The transformer junction box 62 receives terminals 66 for the primary conductors 60, as further discussed below.

Figure 4:
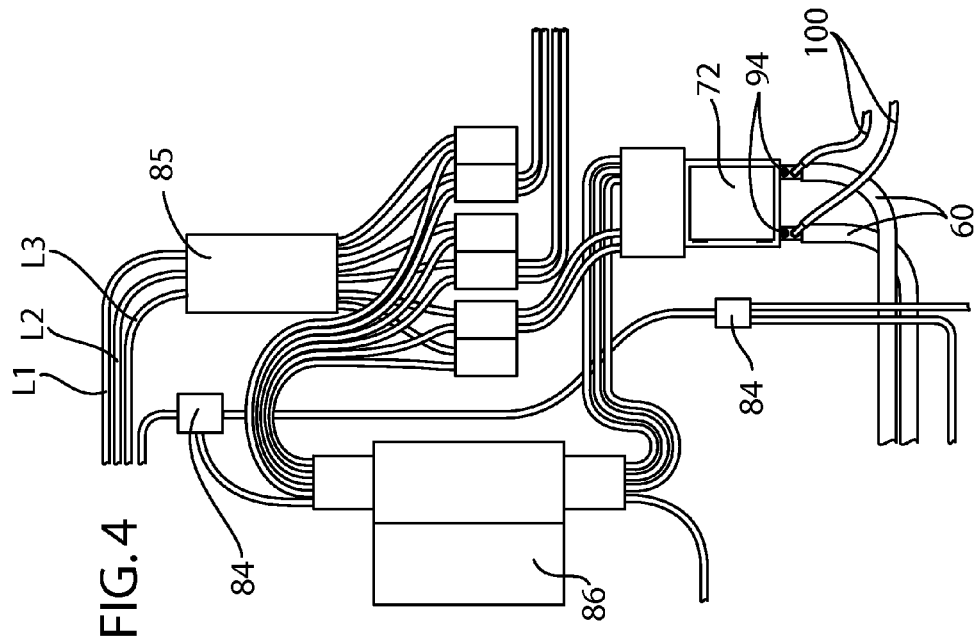
FIG. 4 is another perspective view of the cabinet for the liquid-cooled primary cable at the weld control in accordance with the present invention.
Figure 3:
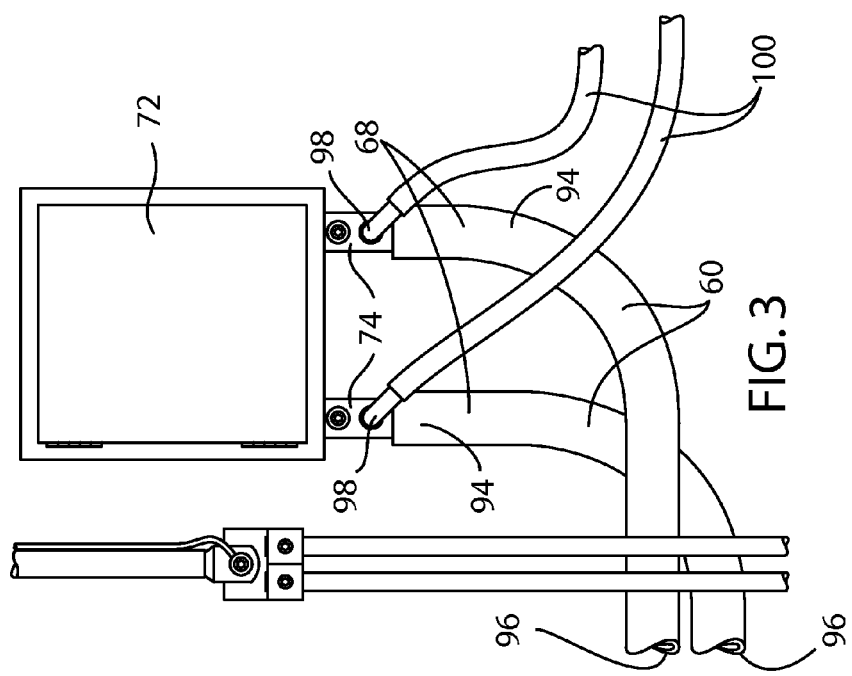
FIG. 3 is a perspective view of the liquid-cooled primary cable at the weld control in accordance with the present invention.

Opposite ends 68 of the primary conductors 60 are located in a cabinet 70 which houses the essential components for the spot welding device of the present invention. These components, as seen in FIGS. 3 and 4, include incoming 480 volt, 3 phase, 60 Hz, 600 A power lines L1, L2, L3, grounds 84, circuit breaker 85, weld timer 86, cooling water supply lines 100, and liquid-cooled primary conductors 60 that control and operate the welding gun 50, as well as the location and position of the electrodes 54 and 56. Toward the bottom of the cabinet 70 is a isolation contactor 72 from which terminals 74 for the primary conductors 60 are located.

Figure 2:
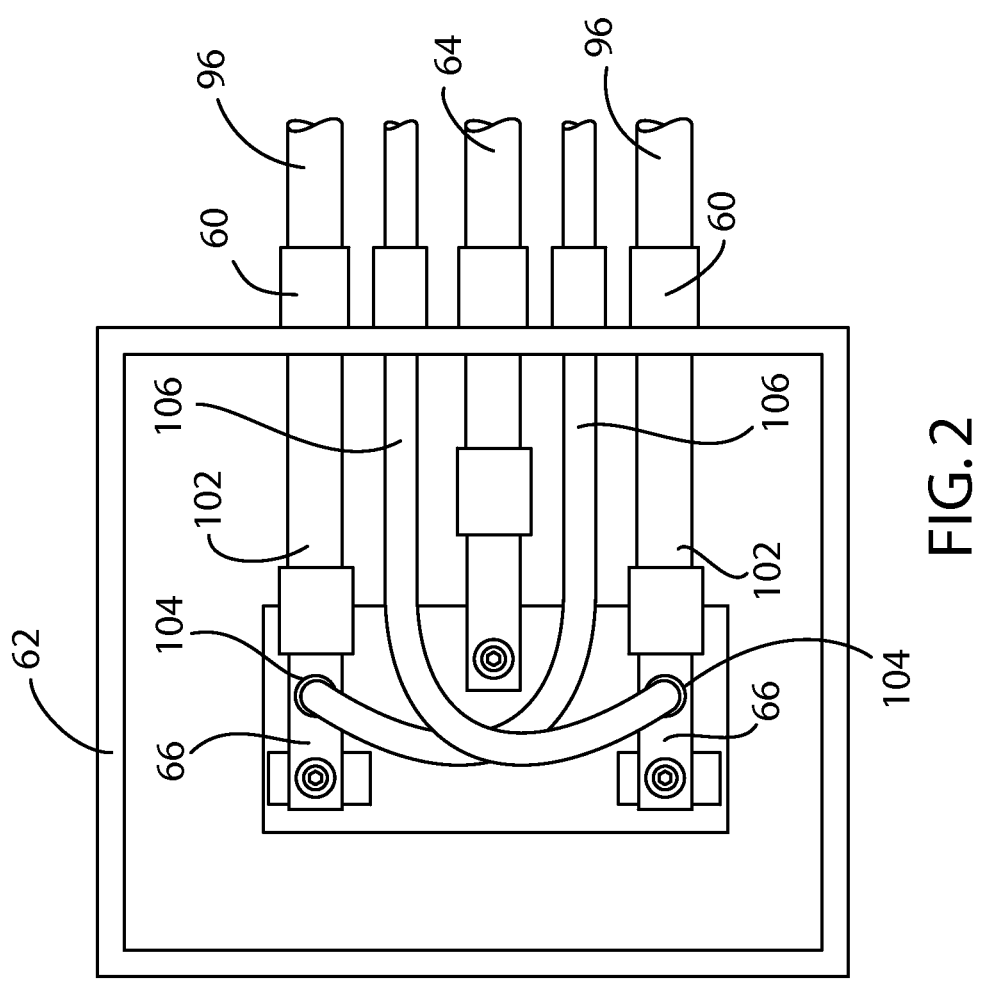
FIG. 2 is a plan view of the trans-gun junction box of a high capacity aluminum spot welding trans-gun incorporating a liquid-cooled primary cable in accordance with the present invention.

The opposite ends of the primary conductors 60 are connected within the transformer junction box 62, along with ground wire 64, as shown in FIG. 2. Alongside the transformer junction box 62, the primary conductors 60, shown diagramically in FIG. 5, flow from the weld controller 70 to a transformer 78 and are attached to the transformer 78 by primary transformer terminals 66. The transformer 78 is, in turn, electrically coupled to the secondary transformer terminals 80 and the secondary conductors 82 to provide electrical power to the welding gun electrodes 54, 56 as discussed above. The primary conductors 60 extend from the cabinet 70 to the transformer junction box 62 through the dress package 58, which is designed to avoid as much abrasion and wear of the electrical components as possible, as well as to provide minimal interference with the operation of the robot 10 during its operation.

As an aluminum spot welding device, the trans-gun 50 may be operated at high primary voltages and currents, i.e., 600V and 1800 continuous amps at 100% duty cycle, respectively. Such voltages and currents have in the past required significant cross-sectional diameters of conductive material in the primary conductor 60, often exceeding 500 mcm, as in the case of air-cooled primary conductors. Thus, the prior art solution was to use a thin flexible insulator encasing a thick copper wire, since standard cable insulation thicknesses tended to retain heat. Other solutions included thicker cables or thinner/flexible coatings.

The secondary conductors 82 are low voltage (4 to 50V) and high current cables that run from the transformer secondary terminals 80 to the electrodes 56, 58 of the welding gun 50. In the past, these secondary conductors 82 have been water cooled. In contrast, the primary conductor 60 of the present invention for the first time uses a liquid-cooled high voltage (600V) and high current cable that runs from the isolation contactor 72 to the transformer primary terminals 66. It is contemplated that voltages of 400V may also be employed in some applications, particularly in the context of European practice. Such high voltage water-cooled primary conductors have long been used for chemical furnaces, induction heaters, vacuum furnaces, and high frequency electric arc furnaces in limited, non-flexing applications. None have been adapted for use in welding applications and, in particular, welding applications requiring highly flexible motions, such as a robot dress package. To make the primary conductor 60 flexible and wear resistant enough for practical use on a robot and safe for use with high voltage, the cross-sectional diameter of the conductive material was reduced to 350 mcm in accordance with the present invention and a liquid-cooled primary conductor cooling system was adopted. The final conductor design of the present invention thus saves cost and provides improved performance.

Figure 5:
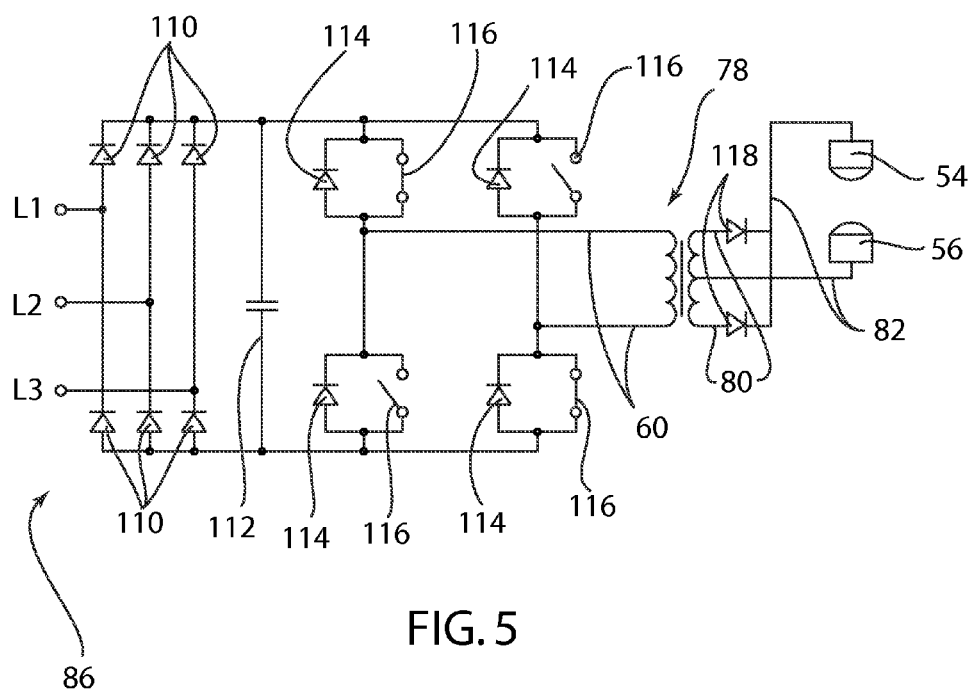
FIG. 5 is a circuit diagram of the weld control, liquid-cooled primary conductor, transformer, secondary conductor and weld gun in accordance with the present invention.

As shown in FIG. 5, circuit 86 includes the primary input lines L1, L2, and L3 which represent the three phase voltage being provided to the weld timer 86. The circuit diagram also includes diodes 110 for allowing current to pass in only one direction, capacitor 112 in parallel with the diodes 110, and IGBTs 114 and 116 for controlling the flow through the circuit. Diodes 118 on the opposite side of transformer 78 proximate secondary conductors 82 provide conductors 82 with controlled one-way current flow.

The water-cooled primary conductor 60 cooling system 90 includes a supply tank 92 preferably filled with a coolant consisting of a mixture of ethylene glycol and water. A pump 88 preferably passes the coolant to a cabinet 70, which houses the weld timer 86 and isolation contactor 72, as shown in FIGS. 1, 3, and 4. The weld timer 86, shown in FIG. 4, provides the switching function for the actuation and activation of the high capacity aluminum spot welding trans-gun 50, as is known in the art. At the primary terminals 74 of the primary conductor 60 at the isolation contactor 72, a first end 94 of a sealed hose 96 is concentrically disposed about each of the primary conductors 60. The first end 94 of the sealed hose 96 is provided with a coolant fitting 98 to which a coolant supply line 100 from the pump 88 is attached. The opposite end 102 of the sealed hose 96 is disposed in the transformer junction box 62, and a coolant fitting 104 is similarly provided to which the coolant return lines 106 are attached to return the coolant to the supply tank 92 after passing through heat exchanger 108. The sealed hoses 96 concentrically disposed about each of the primary conductors 60 essentially along their entire length effectively form a water jacket about the primary conductors 60, removing the excessive heat energy generated by the electrical resistance created by the 600V passing through the relatively small cross-sectional diameter of the conductive material, i.e., less than 350 mcm. Preferably, the primary conductor 60 has a resistance of less than 30 microohms per foot and a heat removal rate of 5338 BTUs per minute, or 320,256 BTUs per hour. The return coolant lines for the secondary conductors 82, if any, may be also used to return the coolant from the primary conductors 60 in the dress package, eliminating redundant water cooling hoses.

In order to accomplish the objectives of this invention, several features were required. First, existing water-cooled high voltage cables, none of which are used in welding applications, are capable of a very high dielectric strength (e.g., 30,000 to more than 1,000,000 volts). However, the insulation material used in such existing water-cooled high voltage cables are not flexible enough for a robotic application. In contrast, the insulation materials used with existing low voltage flexible water-cooled secondary conductors are capable of providing the required flexibility, but in the high voltage environment of the present invention would otherwise present a shock or arcing hazard and would not be allowed by current electrical codes and standards. Thus, the material of the primary conductor 60 insulation was selected to eliminate carbon black and other conductive materials used in existing low voltage flexible water-cooled cables. Preferably, an abrasion and temperature resistant material with at least a 15,000 volt dielectric strength is employed.

Further, the supply water hoses 100 used on the welding system must also be made from a material that has a relatively high dielectric strength and thus avoids shock or arcing hazards. Preferably, the supply water hoses 100 are fabricated from a hose that was made from non-conducting materials.

The coolant also must be free of any conductors, such as iron, copper and other electrically conductive materials, flowing through in the welding system. Also, the minerals and salts that build up in commercial quality cooling water systems and changes in pH over time could also cause the water to become a conductor. To remedy this hazard, the present invention contemplates that there be a minimum length of non-conducting hose between any interconnected items or water circuit paths. Based on data and calculations using a mixture of ethylene glycol and water, a minimum length of non-conducting hose between any primary conductors and any other conductor or ground must be no less than 18 inches. Other minimum lengths may be required in the case of other coolants.

While application of a high capacity aluminum spot welding trans-gun has been described above for adaptation for use by an automated robot, it should be noted that the present invention can be advantageously adapted for other uses for high capacity aluminum spot welding trans-guns. For example, in instances where the welding gun is stationary, but the work piece to be welded is brought into operational relationship with the welding trans-gun, the use of the liquid-cooled high voltage primary conductor of the present invention nevertheless provides advantages in terms of cost savings over the alternative thick conductor primary cable and its associated costs. Likewise, to the extent that the high capacity aluminum spot welding trans-gun might be manually employed, e.g., suspended from an elevated position for use in manually spot welding a multitude of different locations by an operator, the benefits of the increased manipulation capability of the high capacity aluminum spot welding trans-gun having a liquid-cooled high voltage primary conductor are still realized. Thus, the present invention should not be deemed as being limited to application for robotic uses only.

As shown in Table I below, compared to air-cooled primary conductors, the primary conductor bend radius of the primary conductor 60 of the present invention is significantly improved to 2.3 inches from 12.0 inches, even though the former includes a water jacket. Also, a significant cost reduction has been realized. Further, the primary conductor current capacity increased threefold at fixed rated weight per foot, allowing 1800 continuous amps, compared to 680 continuous amps. Finally, as result of the present invention, robot dress packaging requirements are reduced.

TABLE I

| Cable Type | Diameter (mcm) | Current Rating (Amps Continuous) | Min Bend Radius (in) | Wt (Lbs/Ft) | Cost/Set |
|---|---|---|---|---|---|
| Air Cooled | 500 | 680 | 12.0 | 2.10 | $24,000.00 |
| Water Cooled | 350 | 1800 | 2.3 | 2.38 | $ 8,000.00 |

In the case of the water-cooled primary conductor described above in Table I, additional weight savings due to possible elimination of water hoses and the water inside them of 2.47 lb/foot in the dress package are not included. Also, as for the cost per set in Table I, the additional cost savings by possible elimination of water hoses in the dress package are not included.

In summary, a water-cooled primary conductor 60 capable of 400V+ for aluminum spot welding applications that transmit welding current of 1800 continuous amps from the weld controller to a robotically mounted trans-gun surpasses air-cooled primary conductors. Additionally, the coolant system 90 for the primary conductor 60 may be employed for secondary functions, such as cooling the transformer 78 and welding electrodes 54, 56, thereby eliminating redundant water cooling hoses and associated requirements. Liquid-cooled primary conductors 60 afford significant improvements to bend radius, which directly impacts robot articulation capability. The cost of the primary conductor 60 is lower as well, in that the cross-sectional area reduction translates to less copper in the primary conductor 60. Finally, the robot dress package requirements become simpler as well.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A high capacity aluminum spot welding trans-gun for use by an automated robot comprising:
   a base;
   a table pivotably mounted to the base;
   a vertical articulating arm mounted at a first end to the table and adapted for motion about two axes relative to the base through a central vertical pivot rod and a first horizontal pivot hinge;
   a horizontal articulating arm mounted at a first end to a second end of the vertical articulating arm and adapted for motion about a second horizontal pivot hinge
   a distal articulating arm mounted at a first end to a second end of the horizontal articulating arm and adapted for motion about a third horizontal pivot hinge;
   a welding gun including a pair of opposed electrodes attached to the distal articulating arm;
   a weld control for controlling the operation of the trans-gun;
   a transformer mounted inside a junction box on the distal articulating arm for controlling the voltage to the trans-gun having a primary input voltage and secondary output voltage;
   a liquid-cooled high voltage primary conductor supplying at least 400V that electrically connects the weld control to the transformer primary input, the liquid-cooled high voltage primary conductor having a sealed hose concentrically disposed thereabout substantially along an entire length of the primary conductor and the liquid-cooled high voltage primary conductor being encased in a nonconductive insulative coating,
   a low voltage secondary conductor that electrically connects the transformer secondary output to the welding gun, and the high voltage primary conductor and the low voltage secondary conductor are electrically coupled to the transformer inside the junction box.

2. The high capacity aluminum spot welding trans-gun of claim 1, wherein the conductive material of the liquid-cooled primary conductor has a cross-sectional diameter of less than 350 mcm.

3. The high capacity aluminum spot welding trans-gun of claim 1, wherein the liquid-cooled primary conductor has a bend radius of less than 2.5 inches.

4. The high capacity aluminum spot welding trans-gun of claim 1, wherein the liquid-cooled primary conductor is rated to at least 1800 amps at 100% duty cycle.

5. The high capacity aluminum spot welding trans-gun of claim 1, wherein the liquid-cooled primary conductor includes a sealed hose disposed concentrically about the primary conductor.

6. The high capacity aluminum spot welding trans-gun of claim 1, wherein the voltage of the secondary conductor is between 4V and 50V.

7. The high capacity aluminum spot welding trans-gun of claim 1, wherein the liquid-cooled primary conductor has a DC resistance of less than 30 microohms per foot and a heat removal rate of 320,256 BTUs per hour.

8. The high capacity aluminum spot welding trans-gun of claim 1, wherein the liquid-cooled primary conductor is further encased in a nonconductive hose concentrically disposed about the primary conductor and its coating to form a water jacket within which a coolant flows.

9. The high capacity aluminum spot welding trans-gun of claim 8, further comprising coolant supply lines, wherein the coolant comprises ethylene glycol and the cooling lines between primary conductors and any other conductor or ground are not less than 18 inches in length.

10. The high capacity aluminum spot welding trans-gun of claim 1, wherein the coolant is treated to reduce its conductivity.

11. The high capacity aluminum spot welding trans-gun of claim 1, wherein the trans-gun is mounted to an articulated robotic arm.

12. The high capacity aluminum spot welding trans-gun of claim 1, wherein the trans-gun is adapted for manual operation.

* * * * *